Aug. 29, 1950     F. E. BRADY, JR     2,520,794
AIR-VOLUME CONTROL MECHANISM
Filed Aug. 16, 1946
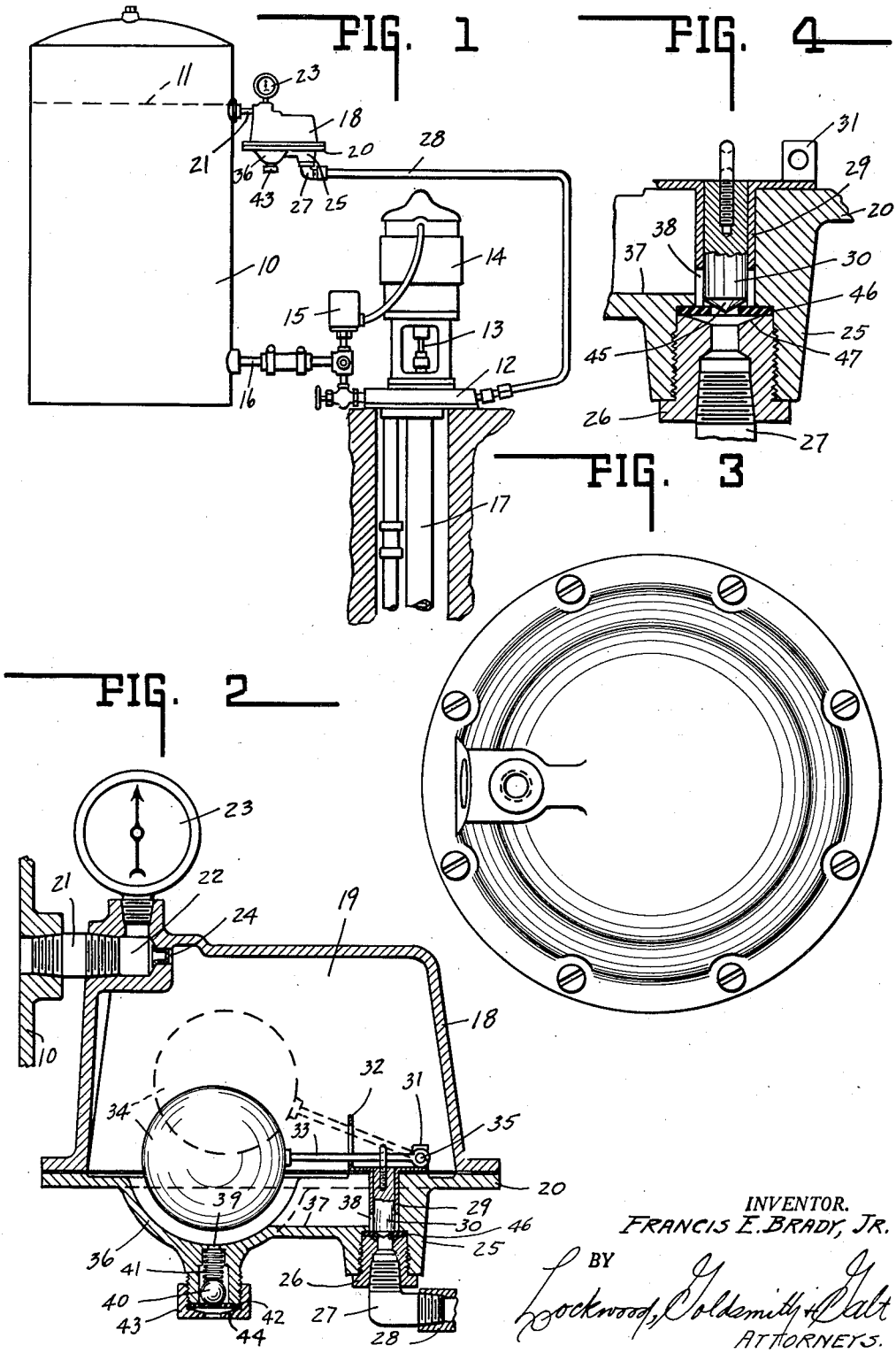
INVENTOR.
FRANCIS E. BRADY, JR.
BY
Lockwood, Goldsmith & Galt
ATTORNEYS.

Patented Aug. 29, 1950

2,520,794

UNITED STATES PATENT OFFICE 2,520,794

AIR-VOLUME CONTROL MECHANISM

Francis E. Brady, Jr., Muncie, Ind.

Application August 16, 1946, Serial No. 691,077

3 Claims. (Cl. 103—6)

This invention relates to air-volume control mechanism that is primarily adapted for incorporation in a hydro-pneumatic water supply system.

In the use of a hydro-pneumatic water supply system, it is essential that the air supplying means not only supplies the necessary air but that it will automatically cease supplying air when the proper amount of air has been delivered to the tank.

According to this invention, a novel mechanism has been associated with a hydro-pneumatic water system for the purpose of supplying air and maintaining a proper proportion of air and water in such system.

When the pump starts to operate there is a drop in pressure in the suction line creating a partial vacuum and then when it is stopped, the pressure back to the check valve in the suction line builds up to tank pressure. The novel mechanism involving this invention utilizes this difference in pressure to introduce air into the system when needed to maintain the proper air cushion in the tank.

To this end there is provided an equalizing chamber connected by a restricted orifice with the tank, said chamber having a check valve controlled air inlet and a float controlled valve effected by the water level in the chamber for controlling its connection with the suction line to the pump whereby excess water will be drawn off and air admitted to take its place at a predetermined level.

One feature of the invention resides in the float controlled valve in association with a flexible valve seat for controlling the suction line in accordance with the water level in the chamber.

A further feature of the invention resides in the provision of a float receiving well providing a water trap communicating through a ball check valve to the atmosphere, whereby air may be admitted when required but prevented from being drawn into the suction side of the pump.

The full nature of the invention will be understood from the accompanying drawings and the following description and claims:

Fig. 1 is a schematic illustration showing the application of the control mechanism to a hydropneumatic water supply system.

Fig. 2 is a central vertical section through the air-volume control mechanism.

Fig. 3 is a top plan view thereof.

Fig. 4 is an enlarged sectional view through the float actuated valve and valve seat.

In the drawings there is shown a water supply system consisting of a storage tank 10 adapted to operate at a water level substantially at the dotted line 11. Water is supplied to the tank by a centrifugal pump 12 driven by a motor shaft 13 extending from an electric motor 14 controlled in its operation by the switch box 15, which in turn is controlled by the pressure in the tank, all as well known in the art. The pump has its discharge side connected with the tank through the pipe connection 16 and has its suction side connected with the pipe 17 leading from the source of water supply.

The control mechanism comprises the housing 18 enclosing the equalizing chamber 19, said housing having a base plate 20. The housing is supported upon the side of the tank by the connecting fitting 21 at the desired water line level 11 to provide communication between the interior of the tank and the pocket 22 which is connected with the pressure gage 23 and with the equalizing chamber 19 through a nipple having a restricted orifice 24.

The base plate 20 is formed with a downwardly extending boss 25 internally threaded to receive the valve fitting 26. Said valve fitting is connected through the elbow 27 and pipe 28 with the suction side of the pump 12. The boss 25 is provided with a bore in which a bearing sleeve 29 is mounted, said sleeve slidably supporting therein a plunger valve 30, the upper end of said sleeve having a hinge boss 31 and an upstanding guide arm 32 extending within the chamber 19. The plunger valve is pivotally supported upon a float lever 33 carrying a float 34 at one end thereof and pivoted at the other end thereof by the pin 35 to the hinge boss 31. The plunger valve has its connection with the float lever at a point slightly spaced from the pivotal support therefor.

Said base plate is provided with a water trap well 36 of a contour conforming to that of the float and into which the float is permitted to lie when in its lowermost position. The well 36 is in communication with the boss 25 at a level slightly above the lowermost point of the well as indicated at 37 for permitting passage of water to the suction pipe through apertures 38 in the bearing sleeve 29 when the valve is open.

An air vent 39 having a check valve is provided at the lower portion of the well 36, being controlled by a ball check valve 40 urged to closed position by the spring 41. Said valve is provided with a flexible seat 42 comprising an apertured rubber disk held in position by an apertured cap 43 with its inner surface dished as indicated at 44 to permit flexing of the flexible valve seat 42. Similarly, as shown in Fig. 4, the plunger valve 30 has its lower end tapered as indicated at 45 to extend into and seat upon a flexible valve seat disk 46. The valve seat disk 46 is clamped in sealing relation with the boss 25 by the valve fitting 26 having its upper surface dished as indicated at 47 to permit flexing of the flexible valve seat.

Thus, both in respect to the ball check valve and the float controlled plunger valve, their respective flexible valve seats normally extend in a flat plane for initial valve closing engagement, while the dished surface of the cap 43 and fitting 26, respectively, rigidly supports the flexible valve seats and their valves in their full closing position. Thus, the flexible valve seats being permitted to flex or pulsate, the opening and closing action of the valves is extremely sensitive for closely controlling the air and water level condition in the tank.

The above described control mechanism is such that upon the liquid level in the tank being higher than normal, the liquid will flow into the chamber 19 raising the float 34 which opens the valve 30. Upon the pump operating the water will be drawn past the valve 30 into suction pipe 28 from the chamber 19 causing the float to drop into the well 36 closing the valve 30. As water is thus drawn from the chamber, a partial vacuum will be created therein such as to draw air upwardly through the ball check valve 40 to fill the chamber 19 and supply air through the port 24 to the tank to replace the liquid or water drawn therefrom by the suction of the pump. However, when the liquid level has been thus lowered to normal so that no water can pass through port 24 to the chamber, the float will have dropped to a position to close the plunger valve 30. By reason of the float control, the valve 30 closes with a quantity of liquid or water remaining in the well 36 which provides a water trap to prevent any air being drawn through the air inlet 39 to the suction side of the pump past the valve 30.

From the foregoing, it will be apparent that a novel air-volume control mechanism has been devised, such as will supply air and maintain the proper proportion of air to liquid in water supply systems, and through the normal operation thereof.

The invention claimed is:

1. In a water supply system, a tank, a pump for supplying water to said tank, means controlled by the pressure in said tank for starting and stopping said pump, a fluidtight housing defining a chamber having a restricted connection with said tank at the desired water level therein, a connection between the lower portion of said chamber and the suction side of said pump, a valve in said last mentioned connection, a float operably connected with said valve for moving it to open or closed position according to the water level in said chamber, a well provided at the bottom of said housing for receiving said float and having an air inlet in the lower portion thereof, and a check valve in said inlet for admitting air to said chamber, said well forming a water trap for preventing air from being drawn into the suction side of said pump.

2. In a water supply system, a tank, a pump for supplying water to said tank, means controlled by the pressure in said tank for starting and stopping said pump, a fluidtight housing defining a chamber having a restricted connection with said tank at the desired water level therein, a connection between the lower portion of said chamber and the suction side of said pump, a plunger valve for controlling said last mentioned connection, an actuating lever for said valve, a float in said chamber for controlling said lever according to the water level therein, a well provided at the bottom of said housing for receiving said float and having an air inlet in the lower portion thereof, and a check valve in said air inlet for admitting air to said chamber, said well forming a water trap for preventing air from being drawn into the suction connection with the pump.

3. In a water supply system, a tank, a pump for supplying water to said tank, means controlled by the pressure in said tank for starting and stopping said pump, a fluidtight housing defining a chamber having a valve controlled air inlet, a restricted connection between said chamber and tank at the desired water level therein, a bore in the lower portion of said chamber connecting said chamber with the suction side of said pump, a valve mounted in said bore, a float in said chamber operably connected with said valve for opening and closing it according to the water level therein, a rigid fitting in said bore having a depressed conical end surface, and a flexible valve seat mounted across the end surface of said fitting for initial seating engagement with said valve upon closing and depressible thereby into sealing engagement with the depressed surface of said fitting.

FRANCIS E. BRADY, JR.

REFERENCES CITED

The following references are of record in the file of this patent:

UNITED STATES PATENTS

| Number | Name | Date |
|---|---|---|
| 2,172,057 | Burks | Sept. 5, 1939 |
| 2,172,097 | Burks | Sept. 5, 1939 |
| 2,183,421 | Brady | Dec. 12, 1939 |
| 2,252,164 | Cantor | Aug. 12, 1941 |
| 2,421,237 | Bergh | May 27, 1947 |
| 2,457,863 | Burks | Jan. 4, 1949 |
| 2,479,247 | Matthews | Aug. 16, 1949 |